United States Patent
Mitani et al.

(10) Patent No.: US 12,479,141 B2
(45) Date of Patent: Nov. 25, 2025

(54) INJECTION MOLDING MACHINE, CONTROL METHOD, AND NON-TRANSITORY COMPUTER READABLE RECORDING MEDIUM

(71) Applicant: THE JAPAN STEEL WORKS, LTD., Tokyo (JP)

(72) Inventors: Soma Mitani, Tokyo (JP); Shogo Kosue, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 71 days.

(21) Appl. No.: 18/691,235

(22) PCT Filed: Jun. 6, 2022

(86) PCT No.: PCT/JP2022/022699
§ 371 (c)(1),
(2) Date: Mar. 12, 2024

(87) PCT Pub. No.: WO2023/037676
PCT Pub. Date: Mar. 16, 2023

(65) Prior Publication Data
US 2024/0375333 A1 Nov. 14, 2024

(30) Foreign Application Priority Data
Sep. 13, 2021 (JP) ................................ 2021-148831

(51) Int. Cl.
*B29C 45/50* (2006.01)
*B29C 45/76* (2006.01)

(52) U.S. Cl.
CPC .......... *B29C 45/5008* (2013.01); *B29C 45/76* (2013.01); *B29C 2045/5056* (2013.01); *B29C 2945/76665* (2013.01)

(58) Field of Classification Search
None
See application file for complete search history.

(56) References Cited

U.S. PATENT DOCUMENTS

| | | |
|---|---|---|
| 2020/0368953 A1 | 11/2020 | Komiya |
| 2021/0001526 A1 | 1/2021 | Hirano et al. |
| 2021/0094211 A1 | 4/2021 | Nanri et al. |

FOREIGN PATENT DOCUMENTS

| | | |
|---|---|---|
| EP | 0806277 A1 | 11/1997 |
| EP | 0965431 A2 | 12/1999 |

(Continued)

OTHER PUBLICATIONS

International Search Report for International Patent Application No. PCT/JP2022/022699, Jul. 12, 2022.

(Continued)

*Primary Examiner* — Yung-Sheng M Tsui
(74) *Attorney, Agent, or Firm* — Potomac Law Group, PLLC

(57) ABSTRACT

An injection molding machine includes a screw provided in a cylinder having a nozzle at a tip so that the screw is allowed to be driven in a rotational direction and an axial direction, a drive device configured to drive the screw, and a control device configured to control an operation of the drive device, wherein the drive device has a rotatably provided ball screw shaft and a nut screwed onto the ball screw shaft and moved forward and backward in response to rotation of the ball screw shaft, and includes a ball screw configured to drive the screw in the axial direction by forward and backward movement of the nut, and the control device sequentially moves a screw position before injection and a screw position after injection in a molding process cycle so that a forward/backward movement range of the nut in the molding process cycle is dispersed.

8 Claims, 16 Drawing Sheets

(56) References Cited

FOREIGN PATENT DOCUMENTS

| | | | |
|---|---|---|---|
| EP | 0967064 A1 | 12/1999 | |
| JP | S59-229271 A | 12/1984 | |
| JP | 2000355035 A | * 12/2000 | ............ B29C 45/83 |
| JP | 2019-14057 A | 1/2019 | |
| JP | 2019-166702 A | 10/2019 | |
| JP | 2020-189459 A | 11/2020 | |
| WO | WO 2017/135403 A1 | 8/2017 | |

OTHER PUBLICATIONS

Office Action issued Sep. 3, 2024, in Japanese Patent Application No. 2021-148831.
Extended European Search Report and European Search Opinion issued Jul. 18, 2025, in European Patent Application No. 22867006.3.

* cited by examiner

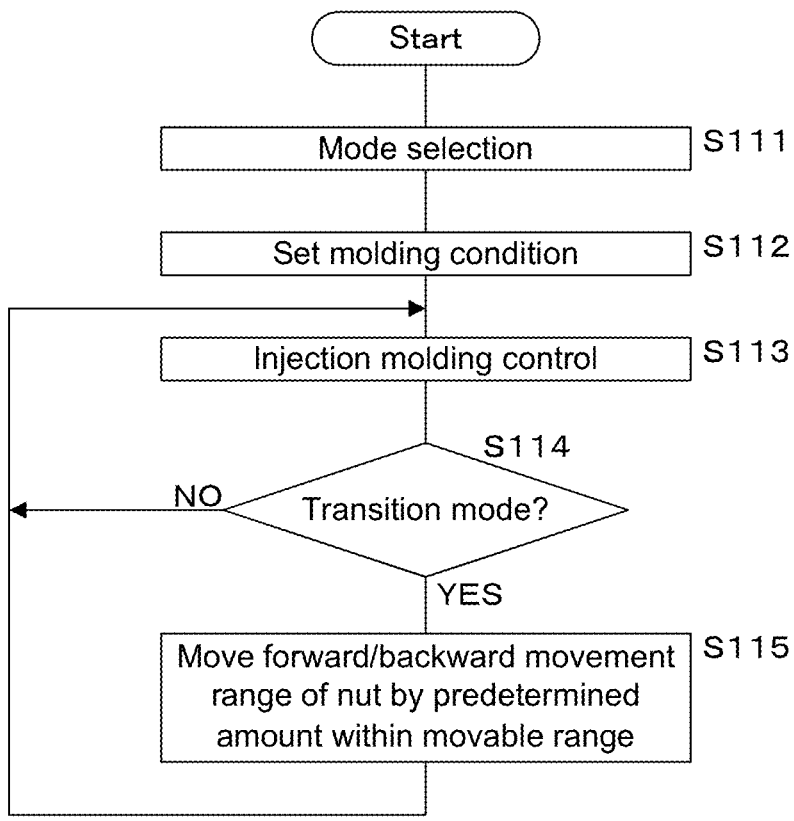

Unused region

Unused region

INJECTION MOLDING MACHINE, CONTROL METHOD, AND NON-TRANSITORY COMPUTER READABLE RECORDING MEDIUM

REFERENCE TO RELATED APPLICATIONS

This application is the national phase under 35 U. S. C. § 371 of PCT International Application No. PCT/JP2022/022699 which has an international filing date of Jun. 6, 2022, and designated the United States of America.

The present invention relates to an injection molding machine, a control method, and a computer program.

BACKGROUND ART

An injection molding machine includes an injection device that melts and injects a molding material and a mold clamping device. The injection device includes a heating cylinder having a nozzle at a tip thereof, and a screw disposed in the heating cylinder so as to be rotatable in a circumferential direction and an axial direction. The screw is driven by a drive mechanism in a rotational direction and the axial direction. The drive mechanism includes a ball screw that converts rotational drive force of an injection servo motor into drive force in the axial direction of the screw and transmits the drive force (for example, Japanese Patent Laid-Open Publication No. 2019-166702).

SUMMARY

Incidentally, depending on the molding conditions, only a part of a stroke range in an entire stroke range in which a nut can move on a ball screw shaft may be used. When a movement range of the nut is concentrated in a specific range, lubricity of grease decreases, resulting in an uneven amount of heat accumulated on the ball screw shaft. Such a short injection stroke molding condition is disadvantageous compared to a molding condition that uses the entire stroke range. Over the long term, only a portion of the ball screw shaft tends to become worn or damaged, which tends to shorten the lifespan of the ball screw.

An object of the present disclosure is to provide an injection molding machine, a control method, and a computer program that can prevent deterioration of lubricity and deviation of a heat generating part and extend the lifespan of the ball screw even under short injection stroke molding conditions.

An injection molding machine according to an aspect of the invention includes a drive device configured to drive a screw and a control device, wherein the drive device has a ball screw including a rotatably provided ball screw shaft and a nut, the ball screw being configured to drive the screw in an axial direction by forward and backward movement of the nut, and the control device sequentially moves a screw position before injection and a screw position after injection in a molding process cycle so that a forward/backward movement range of the nut in the molding process cycle is dispersed.

A control device according to an aspect of the invention is a control method of controlling an operation of a drive device including a ball screw shaft and a nut, and driving a screw of an injection molding machine by forward and backward movement of the nut, and the control method includes sequentially moving a screw position before injection and a screw position after injection in a molding process cycle so that a forward/backward movement range of the nut in the molding process cycle is dispersed.

A computer program according to an aspect of the invention is a computer program for causing a computer to control an operation of a drive device including a ball screw shaft and a nut, and driving a screw of an injection molding machine by forward and backward movement of the nut, and the computer program causes the computer to execute a process of sequentially moving a screw position before injection and a screw position after injection in a molding process cycle so that a forward/backward movement range of the nut in the molding process cycle is dispersed.

According to the invention, it is possible to prevent deterioration of lubricity and deviation of a heat generating part and extend the lifespan of the ball screw even under short injection stroke molding conditions.

The above and further objects and features will more fully be apparent from the following detailed description with accompanying drawings.

BRIEF DESCRIPTION OF DRAWINGS

FIG. 3 is a flowchart illustrating a processing procedure of a processor according to the first embodiment.

DESCRIPTION

Specific examples of an injection molding machine, a control method, and a computer program according to embodiments of the present invention will be described below with reference to the drawings. At least some of the embodiments described below may be arbitrarily combined. Note that the present invention is not limited to these examples, is indicated by the scope of the claims, and is intended to include all changes within the meaning and scope equivalent to the scope of the claims.

Figure 1:
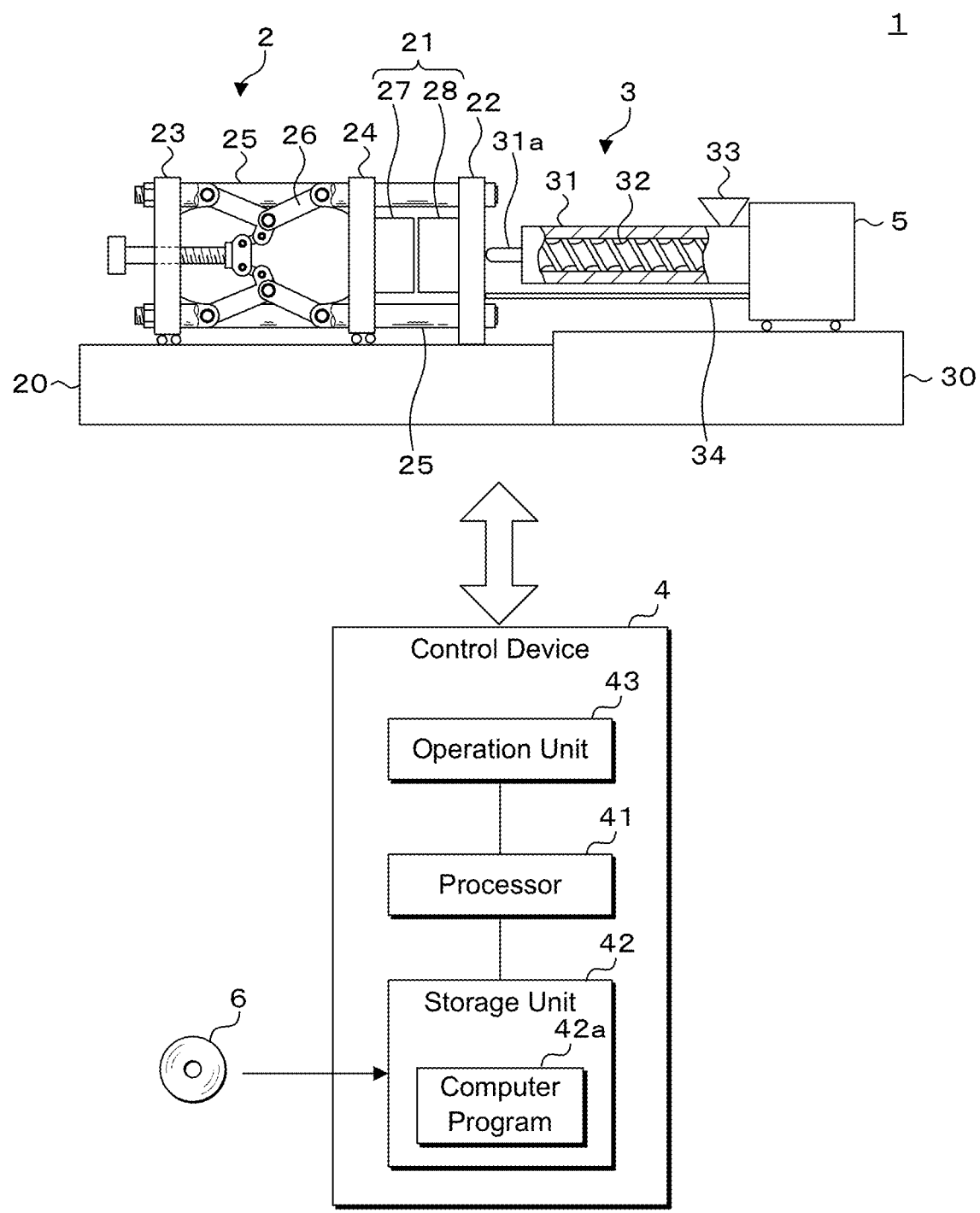
FIG. 1 is a schematic diagram illustrating a configuration example of an injection molding machine according to a first embodiment.

FIG. 1 is a schematic diagram illustrating a configuration example of an injection molding machine 1 according to a first embodiment. The injection molding machine 1 according to the first embodiment includes a mold clamping device 2 that clamps a mold 21, an injection device 3 that melts and injects a molding material, and a control device 4.

The mold clamping device 2 includes a fixed platen 22 fixed on a bed 20, a mold clamping housing 23 slidable on the bed 20, and a movable platen 24 that similarly slides on the bed 20. The fixed platen 22 and the mold clamping housing 23 are coupled by a plurality of tie bars, for example, four tie bars 25, 25, . . . . The movable platen 24 is configured to be able to slide freely between the fixed platen 22 and the mold clamping housing 23. A mold clamping mechanism 26 is provided between the mold clamping housing 23 and the movable platen 24. The mold clamping mechanism 26 includes, for example, a toggle mechanism. Note that the mold clamping mechanism 26 may include a direct pressure-type mold clamping mechanism, that is, a mold clamping cylinder. The fixed platen 22 and the movable platen 24 are provided with a fixed mold 27 and a movable mold 28, respectively, and when the mold clamping mechanism 26 is driven, the mold 21 is opened and closed.

The injection device 3 is provided on a base 30. The injection device 3 includes a heating cylinder 31 having a nozzle 31a at a tip thereof, and a screw 32 disposed in the heating cylinder 31 so as to be rotatable in a circumferential direction and an axial direction. A heater for melting the molding material is provided inside or on an outer periphery of the heating cylinder 31. The screw 32 is driven by the drive device 5 in a rotational direction and the axial direction.

A hopper 33 into which the molding material is inserted is provided near a rear end of the heating cylinder 31. Further, the injection molding machine 1 includes a nozzle touch device 34 that moves the injection device 3 in a front-back direction (left-right direction in FIG. 1). When the nozzle touch device 34 is driven, the injection device 3 moves forward and the nozzle 31a of the heating cylinder 31 touches the mold 21.

The control device 4 is a computer that controls the operations of the mold clamping device 2 and the injection device 3, and includes a processor 41, a storage unit 42, an operation unit 43, etc. as a hardware configuration. Note that the control device 4 may be a server device connected to a network. In addition, the control device 4 may be configured to include a plurality of computers for distributed processing, may be realized by a plurality of virtual machines installed in one server, or may be realized using a cloud server.

The processor 41 includes an arithmetic circuit such as a CPU (Central Processing Unit), a multi-core CPU, a GPU (Graphics Processing Unit), a GPGPU (General-purpose computing on graphics processing units), a TPU (Tensor Processing Unit), an ASIC (Application Specific Integrated Circuit), an FPGA (Field-Programmable Gate Array), or an NPU (Neural Processing Unit), an internal storage device such as a ROM (Read Only Memory) or a RAM (Random Access Memory), I/O terminals, etc. The processor 41 implements a control method according to the first embodiment by executing a computer program (program product) 42a stored in the storage unit 42, which will be described later.

The storage unit 42 is a nonvolatile memory such as a hard disk, an EEPROM (Electrically Erasable Programmable ROM), or a flash memory. The storage unit 42 stores a computer program 42a for causing the computer to sequentially move forward/backward movement ranges of the screw 32 and a nut 51b. Furthermore, the storage unit 42 stores information indicating a movable range of the nut 51b.

The computer program 42a according to the first embodiment may be recorded on a recording medium 6 in a computer-readable manner. The storage unit 42 stores the computer program 42a read from the recording medium 6 by a reading device. The recording medium 6 is a semiconductor memory such as a flash memory. Further, the recording medium 6 may be an optical disc such as a CD (Compact Disc)-ROM, a DVD (Digital Versatile Disc)-ROM, or a BD (Blu-ray (registered trademark) Disc). Furthermore, the recording medium 6 may be a flexible disk, a magnetic disk such as a hard disk, a magneto-optical disk, etc. Furthermore, the computer program 42a according to the first embodiment may be downloaded from an external server connected to a communication network and stored in the storage unit 42.

The operation unit 43 is an input device such as a touch panel, soft keys, hard keys, a keyboard, or a mouse.

Set values are set in the injection molding machine 1 to determine molding conditions such as an injection start point, a resin temperature in the mold, a nozzle temperature, a cylinder temperature, a hopper temperature, mold clamping force, an injection speed, injection acceleration, injection peak pressure, and injection stroke. Further, set values are set in the injection molding machine 1 to determine molding conditions such as cylinder tip resin pressure, a reverse prevention ring seating state, pressure switching pressure, a pressure switching speed, a pressure switching position, a pressure completion position, a cushion position, weighing back pressure, and weighing torque. Furthermore, set values are set in the injection molding machine 1 to determine molding conditions such as a weighing completion position, a screw 32 retraction speed, a cycle time, a mold closing time, an injection time, a holding pressure time, holding pressure, a holding pressure speed, a weighing time, and a mold opening time. The injection molding machine 1 in which these set values are set operates according to the set values.

Figure 2:
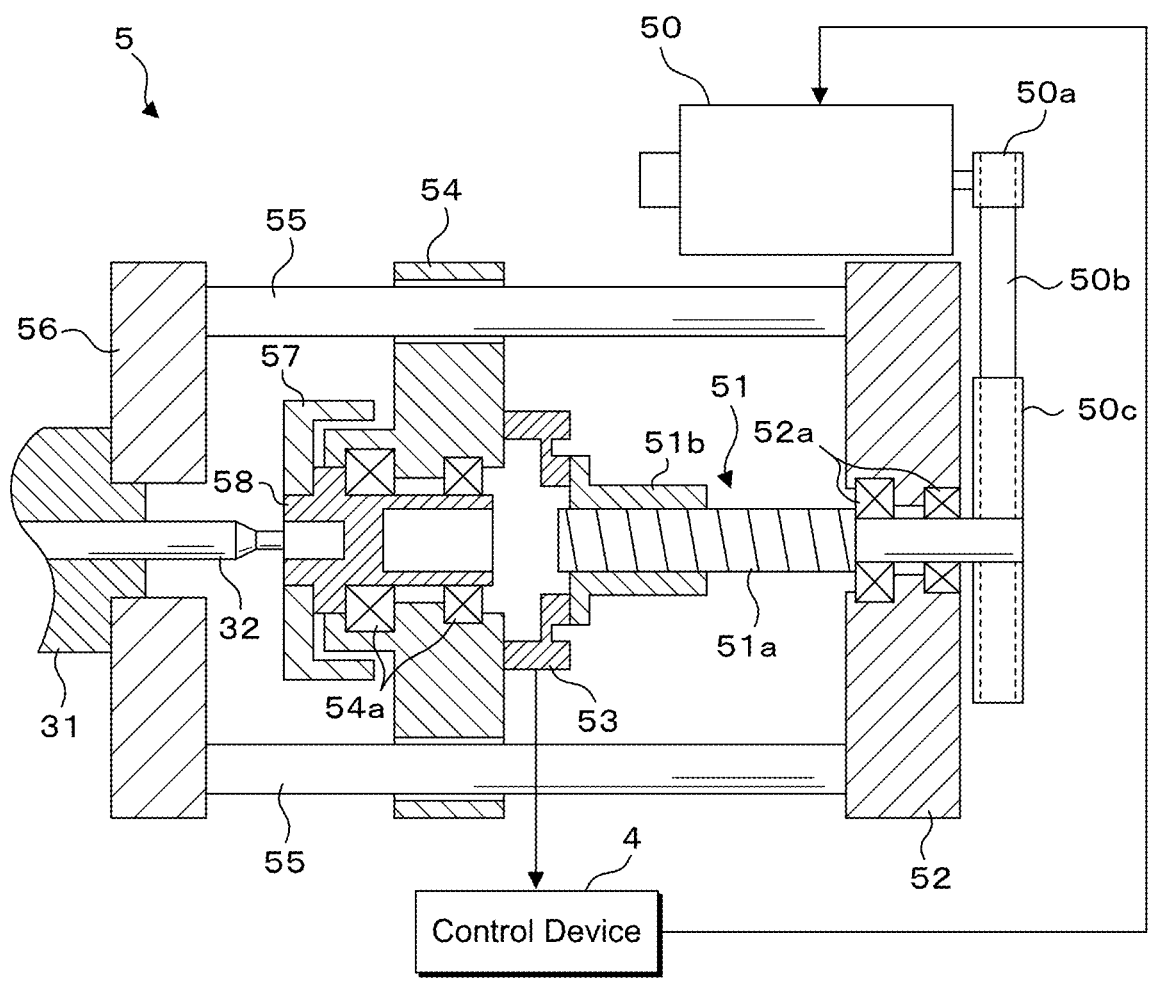
FIG. 2 is a cross-sectional view illustrating a configuration example of a drive device of the injection molding machine according to the first embodiment.

FIG. 2 is a cross-sectional view illustrating a configuration example of a drive device 5 of the injection molding machine 1 according to the first embodiment. The drive device 5 includes an injection servo motor 50 and a ball screw 51 for driving the screw 32 in the axial direction. The injection servo motor 50 is provided with an encoder that detects a rotation angle and outputs a signal indicating the rotation angle to the control device 4. The control device 4 controls rotation of the injection servo motor 50 based on a signal output from the encoder. A small pulley 50a is provided on an output shaft of the injection servo motor 50.

The ball screw 51 includes a ball screw shaft 51a and a nut 51b screwed onto the ball screw shaft 51a. A base end of the ball screw shaft 51a is rotatably supported by a first plate 52 having a hole and a bearing seat via a bearing 52a. A large pulley 50c is provided at the base end of the ball screw shaft 51a. The small pulley 50a and the large pulley 50c are connected by a timing belt 50b, and rotational force of the small pulley 50a is transmitted at a reduced speed to the large pulley 50c, causing the ball screw shaft 51a to rotate.

Hereinafter, a direction toward the based end side of the ball screw shaft 51a (the right side in FIG. 1) will be referred to as a backward direction, and a direction opposite thereto (the left direction in FIG. 1) will be referred to as a forward direction. Further, the forward direction and the backward direction are collectively referred to as a forward/backward direction. When the injection servo motor 50 is driven to rotate the large pulley 50c and the ball screw shaft 51a, the nut 51b moves in the forward direction and the backward direction depending on the rotational direction thereof.

A load cell 53 is provided on the forward direction side surface of the nut 51b, and the forward direction side surface of the load cell 53 is fixed to a second plate 54. A plurality of through holes is formed in the second plate 54, and a guide shaft 55 is inserted through each of the through holes. The second plate 54 is guided by the guide shaft 55 and moves in the forward/backward direction. A third plate 56 is provided on the forward direction side of the first plate 52, and one end and the other end of the guide shaft 55 are supported by the first plate 52 and the third plate 56, respectively. When the ball screw shaft 51a rotates, the nut 51b, the load cell 53, and the second plate 54 move together in the forward/backward direction along the guide shaft 55.

The second plate 54 is provided with a hole and a bearing seat, and an output shaft 58 is supported in the hole via a bearing 54a. A plasticizing pulley 57 is provided on the output shaft 58. The plasticizing pulley 57 is coupled to a pulley attached to a screw rotation motor (not illustrated) via a timing belt (not illustrated). A rotation center of the output shaft 58 coincides with a rotation center of the ball screw shaft 51a. On the output shaft 58, a recess, into which a tip of the ball screw shaft 51a enters when the nut 51b moves forward and backward, is formed. Further, one end of the screw 32 is fixed to the output shaft 58 so that central axes thereof coincide with each other. A through hole through which the screw 32 is inserted is formed in the third plate 56. One end of the heating cylinder 31 is fixed to the third plate 56 so that the screw 32 inserted through the through hole of the third plate 56 can move in the axial direction inside the heating cylinder 31.

An outline of a molding process cycle is as follows, and the control device 4 performs a process of sequentially moving the forward/backward movement range of the nut 51b in a repeated molding process cycle. During injection molding, the well-known mold closing process, mold clamping process, injection unit advancement process, injection process, weighing process, injection unit retraction process, mold opening process, and eject process are sequentially performed.

Particularly in the weighing process, a molding material made of resin or low melting point metal is supplied from the hopper 33 to the rear of the heating cylinder 31. The molding material supplied to the rear of the heating cylinder 31 is melted and kneaded by heating by the heater and shearing action by rotating the screw 32, and is fed into a tip region of the heating cylinder 31. The screw 32 gradually moves in the backward direction as a plasticized molding material accumulates in a tip region of the screw 32. The screw 32 moves to a set weighing completion position, and a certain amount of molding material is measured.

In the injection process, the injection servo motor 50 is driven, and rotational force thereof is transmitted to the ball screw shaft 51a via the small pulley 50a, the timing belt 50b, and the large pulley 50c, and the nut 51b, the load cell 53, the second plate 54, and the screw 32 moves in the forward direction. As the screw 32 moves forward, the molding material stored in the tip region of the heating cylinder 31 is injected into the mold 21 from the nozzle 31a and fills the mold 21. By moving the screw 32 to a set holding pressure switching position, a certain amount of the molding material is injected into the mold 21.

FIG. 3 is a flowchart illustrating a processing procedure of the processor 41 according to the first embodiment. The processor 41 receives selection of a transition mode or a normal mode via the operation unit 43 (step S111). An operator can select the transition mode or the normal mode by manually operating the operation unit 43. The transition mode is a mode in which the control method according to the first embodiment is used, and is a mode in which the forward/backward movement range of the nut 51b is sequentially moved. The normal mode is a mode in which the control method according to the first embodiment is not used, and is a mode in which the nut 51b is moved forward and backward according to a set molding condition. In other words, the normal mode is a mode in which the forward/backward movement range of the nut 51b is not changed.

Next, the processor 41 sets a molding condition (step S112). The molding condition includes a screw position before injection and a screw position after injection as set values particularly related to the first embodiment. The screw position before injection is a screw position when starting injection or a screw position when weighing of the molding material is completed. The screw position after injection is a screw position when injection is finished or a holding pressure switching position. The processor 41 executes processing related to injection molding control based on the molding condition (step S113). The processor 41 executes the mold closing process, the mold clamping process, the injection unit advancement process, the injection process, the weighing process, the injection unit retraction process, the mold opening process, and the eject process by controlling the operations of the mold clamping device 2, the injection device 3, the nozzle touch device 34, the drive device 5, etc.

Next, the processor 41 determines whether or not the transition mode is selected (step S114). When it is determined that the transition mode is not selected (step S114: NO), the processor 41 returns the process to step S113 and repeatedly executes the molding process cycle without changing the weighing completion position and the holding pressure switching position of the screw 32. In other words, the molding process cycle is repeated without changing the forward/backward movement range of the screw 32.

When it is determined that the transition mode is selected (step S114: YES), the processor 41 moves the forward/backward movement range of the nut 51b by a predetermined amount within the movable range (step S115), and returns the process to step S113. The forward/backward movement range is, for example, a range from the position of the nut 51b corresponding to the weighing completion position to the position of the nut 51b corresponding to the pressure holding switching position. In other words, the processor 41 moves the injection screw position before injection and the injection screw position after injection by a predetermined amount within the movable range based on information stored in the storage unit 42 indicating the movable range of the nut 51*b*. Specifically, the processor 41 increases or decreases the weighing completion position and the pressure holding switching position by a predetermined amount.

Figure 4A:
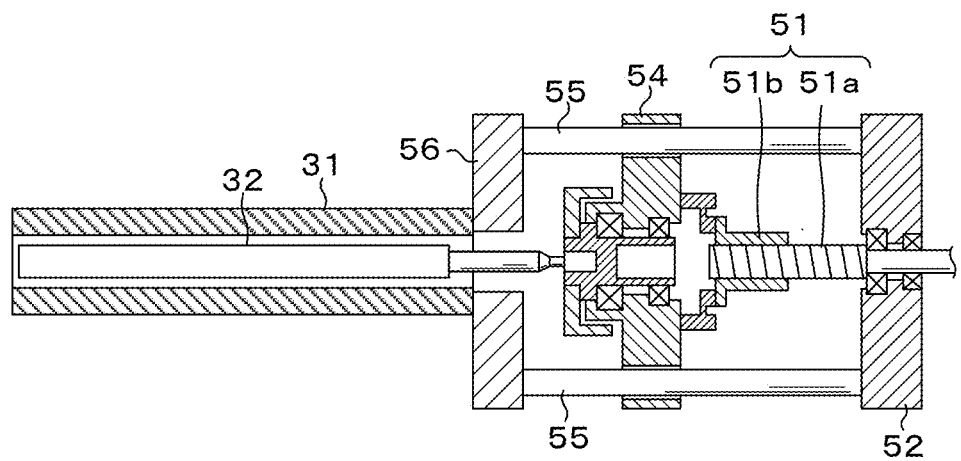
FIG. 4A is an explanatory diagram illustrating a state before changing a forward/backward movement range in a control method according to the first embodiment.
Figure 4B:
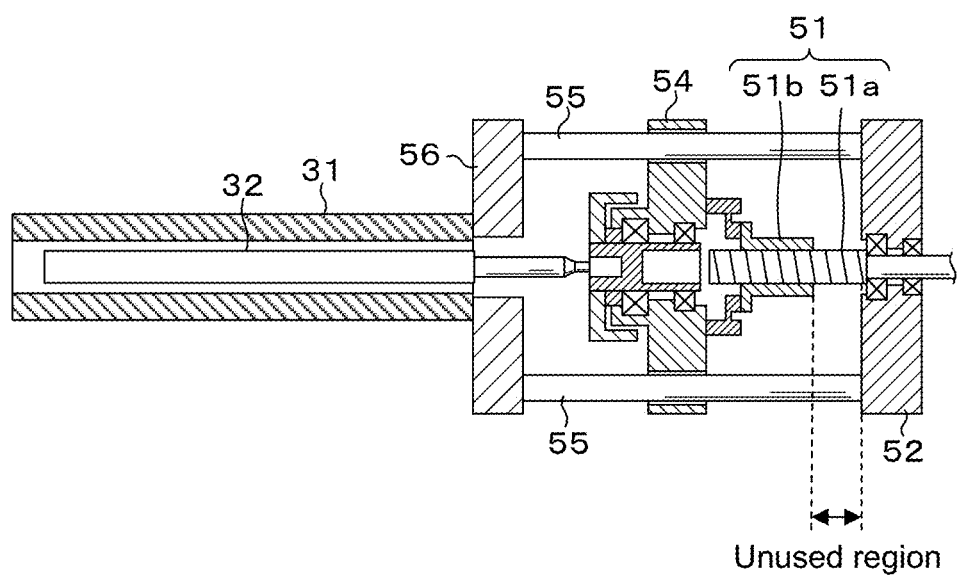
FIG. 4B is an explanatory diagram illustrating a state before changing the forward/backward movement range in the control method according to the first embodiment.

FIGS. 4A and 4B are explanatory diagrams illustrating a state before changing the forward/backward movement range in the control method according to the first embodiment. FIG. 4A illustrates the drive device 5 at the holding pressure switching position, and FIG. 4B illustrates the drive device 5 at the weighing completion position. In a process of moving the nut 51*b* and the screw 32 from the position illustrated in FIG. 4A to the position illustrated in FIG. 4B, a molding resin is weighed and melted and kneaded. Then, by moving the nut 51*b* and the screw 32 from the position illustrated in FIG. 4B to the position illustrated in FIG. 4A, a plasticized molding resin is injected into the mold 21. The nut 51*b* moves forward and backward on a part of the ball screw shaft 51*a*, and depending on the molding condition, there may be an unused region as illustrated in FIG. 4B.

Figure 5A:
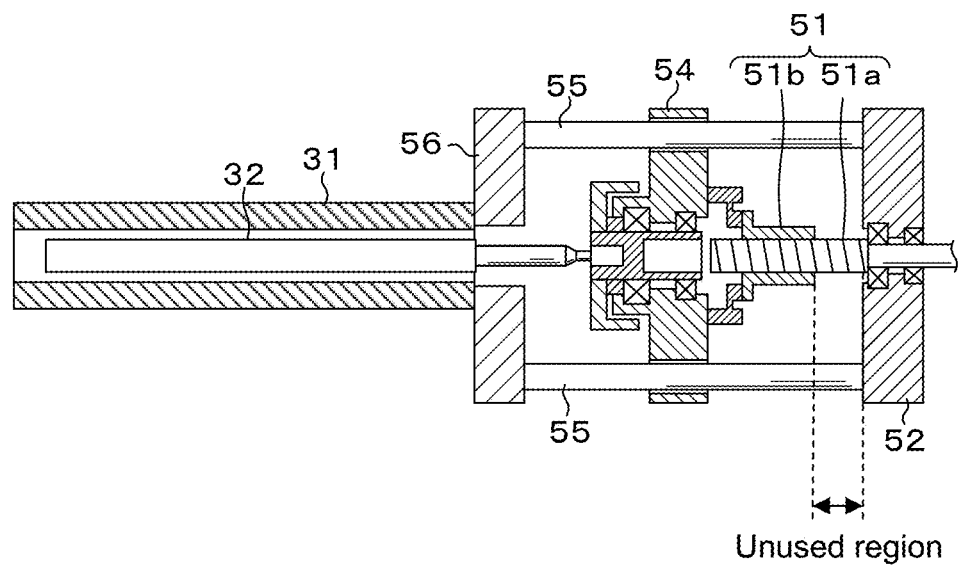
FIG. 5A is an explanatory diagram illustrating a state after changing the forward/backward movement range in the control method according to the first embodiment.
Figure 5B:
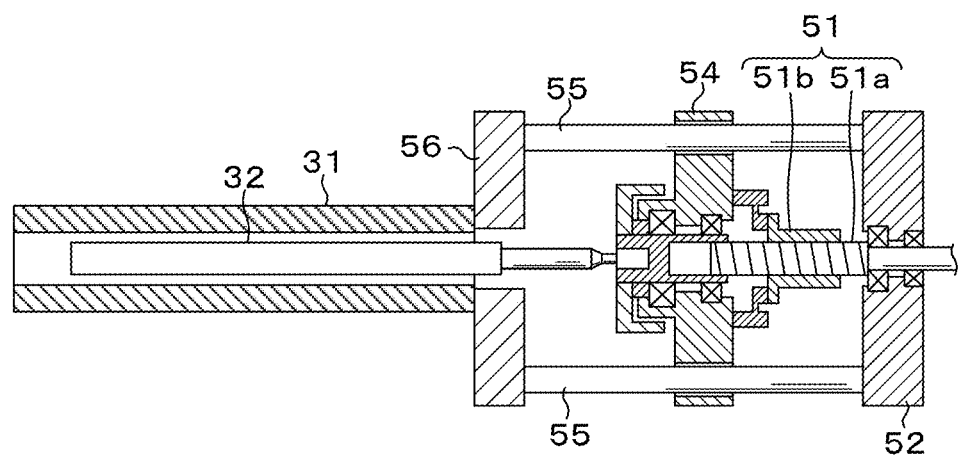
FIG. 5B is an explanatory diagram illustrating a state after changing the forward/backward movement range in the control method according to the first embodiment.

FIGS. 5A and 5B are explanatory diagrams illustrating a state after changing the forward/backward movement range in the control method according to the first embodiment. FIG. 5A illustrates the drive device 5 at the holding pressure switching position, and FIG. 5B illustrates the drive device 5 at the weighing completion position. Similar to FIGS. 4A and 4B, the molding material is weighed and injected by moving the nut 51*b* and the screw 32. In the example illustrated in FIGS. 5A and 5B, the forward/backward movement range of the nut 51*b* moves in the backward direction, and weighing and injection are performed using the unused region in FIGS. 4A and 4B. Since both the weighing completion position and the holding pressure switching position move by a predetermined amount in the same direction, and there is no change in the moving distance from the weighing completion position to the holding pressure switching position, the weight of the molding material injected into the mold 21 is basically the same.

In the molding process cycle in which the transition mode is selected, the processes from step S113 to step S115 are repeatedly executed, and the forward/backward movement ranges of the nut 51*b* and the screw 32 are moved by a predetermined amount. Note that the processor 41 preferably moves the forward/backward movement range by reciprocating the forward/backward movement range within the movable range of the nut 51*b*.

In other words, the processor 41 moves the weighing completion position and the pressure holding switching position in the backward direction by a predetermined amount, and when the weighing completion position reaches a limit of the movable range of the nut 51*b* (the end in the backward direction), the processor 41 changes the moving direction of the weighing completion position and the pressure holding switching position, and moves the weighing completion position and the pressure holding switching position in the forward direction by a predetermined amount. In addition, the processor 41 moves the weighing completion position and the pressure holding switching position in the forward direction by a predetermined amount, and when the weighing completion position reaches a limit of the movable range of the nut 51*b* (the end in the forward direction), the processor 41 changes the moving direction of the weighing completion position and the pressure holding switching position, and moves the weighing completion position and the pressure holding switching position in the backward direction by a predetermined amount. Thereafter, by moving the weighting completion position and the pressure holding switching position by a predetermined amount using the method described above, the forward/backward movement range can be reciprocated.

According to the injection molding machine 1 according to the first embodiment configured as described above, since the nut 51*b* is configured to move forward and backward within the movable range of the ball screw shaft 51*a* even under a short injection stroke molding condition, it is possible to prevent deterioration of lubricity and deviation of a heat generating part and extend the lifespan of the ball screw 51 even under short injection stroke molding conditions.

Note that, even though an example of moving the weighing completion position and the pressure holding switching position by the same amount has been described in the first embodiment, the weighing completion position and the pressure holding switching position may be configured to be moved by different amounts so that the injection amount does not change depending on the type of molding material, the position of the forward/backward movement range, etc.

Second Embodiment

An injection molding machine 1 according to a second embodiment is different from the first embodiment in that the forward/backward movement range of the nut 51*b* is randomly moved. The other configurations of the injection molding machine 1 are the same as those of the injection molding machine 1 according to the first embodiment, and thus the same reference numerals are attached to similar parts and detailed descriptions are omitted.

Figure 6:
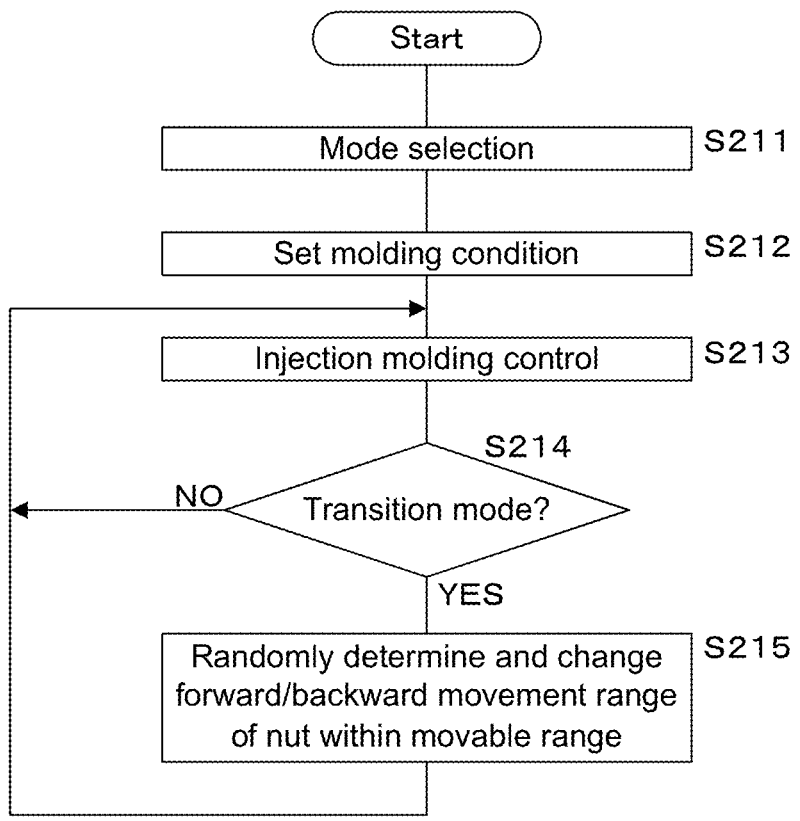
FIG. 6 is a flowchart illustrating a processing procedure of a processor according to a second embodiment.

FIG. 6 is a flowchart illustrating a processing procedure of the processor 41 according to a second embodiment. As in the first embodiment, the processor 41 receives mode selection (step S211), sets a molding condition (step S212), and executes processing related to injection molding control (step S213).

When it is determined that the transition mode is not selected (step S214: NO), the processor 41 returns the process to step S213. When the transition mode is selected (step S214: YES), the processor 41 randomly determines and changes the forward/backward movement range of the nut 51*b* within the movable range (step S215), and returns the process to step S213. In other words, based on information indicating the movable range of the nut 51*b* stored in the storage unit 42, the processor 41 randomly changes the screw position before injection and the screw position after injection while maintaining a relative distance between the screw position before injection and the screw position after injection within the movable range. In addition, it can be considered that the weighing completion position and the pressure holding switching position are randomly changed by the processor 41 while maintaining a relative distance between the weighing completion position and the pressure holding switching position. Since the relative distance between the weighing completion position and the pressure holding switching position is constant, the weight of the molding material injected into the mold 21 is basically the same.

According to the injection molding machine 1 according to the first embodiment, as in the first embodiment, it is possible to prevent deterioration of lubricity and deviation of a heat generating part and extend the lifespan of the ball screw 51 even under short injection stroke molding conditions.

Third Embodiment

An injection molding machine 1 according to a third embodiment is different from the first embodiment in that the forward/backward movement range of the nut 51*b* is moved while avoiding a worn part of the ball screw shaft 51*a*. The other configurations of the injection molding machine 1 are the same as those of the injection molding machine 1 according to the first embodiment, and thus the same reference numerals are attached to similar parts and detailed descriptions are omitted.

Figure 7:
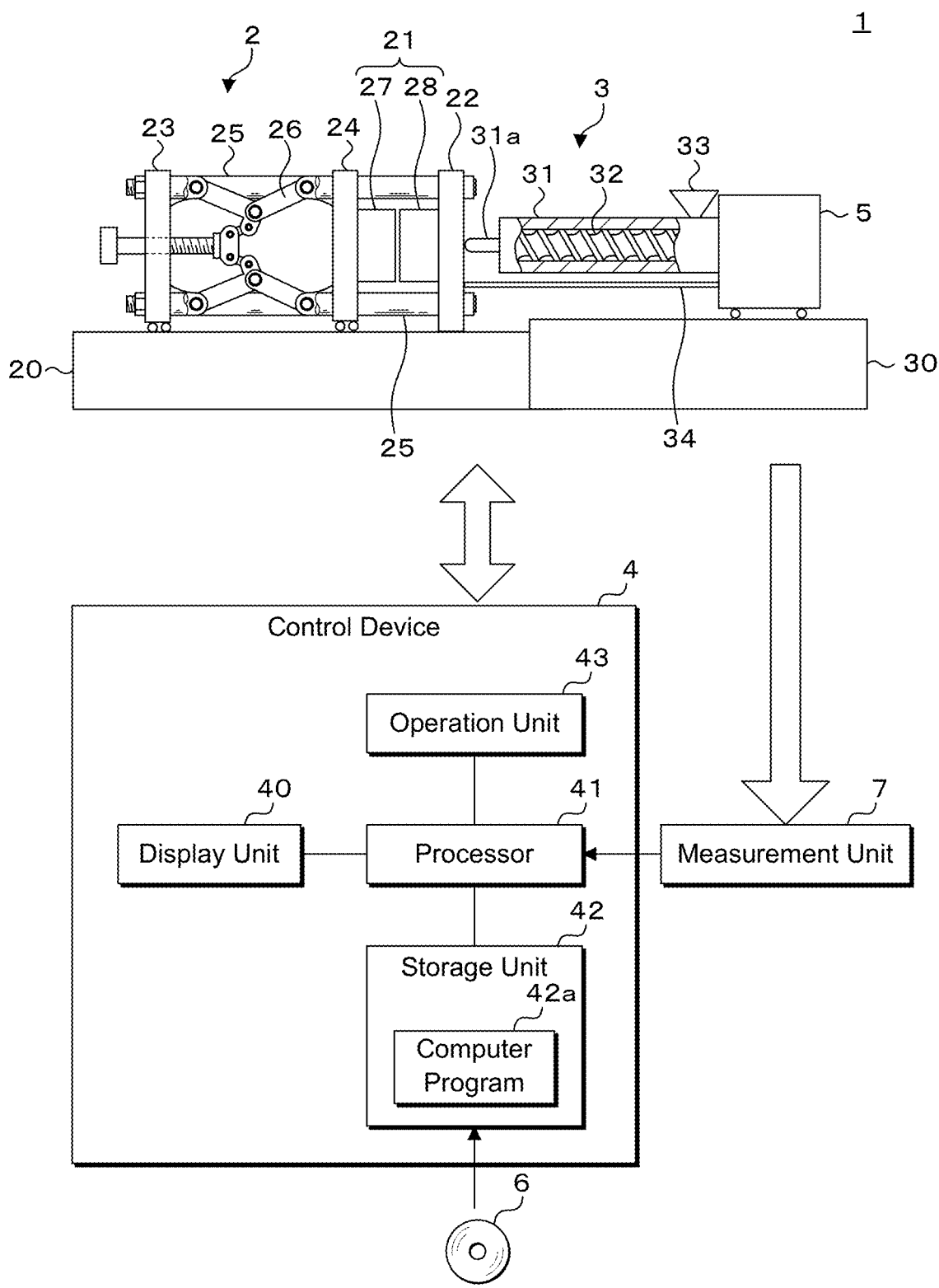
FIG. 7 is a schematic diagram illustrating a configuration example of an injection molding machine according to a third embodiment.

FIG. 7 is a schematic diagram illustrating a configuration example of the injection molding machine 1 according to the third embodiment. The injection molding machine 1 according to the third embodiment includes a measurement unit 7. The measurement unit 7 is, for example, a vibration sensor or an acceleration sensor provided on the nut 51*b*, and outputs a detected acceleration signal to the control device 4. The processor 41 of the control device 4 AD-converts the acceleration signal output from the measurement unit 7 into acceleration data and acquires the acceleration data. The control device 4 can detect wear of the ball screw shaft 51*a* based on the acceleration data. For example, when an average value of acceleration is equal to or greater than a predetermined value, the processor 41 determines that the ball screw shaft 51*a* is worn. Moreover, the control device 4 AD-converts a signal output from the encoder of the injection servo motor 50 into rotation angle data and acquires the rotation angle data. The control device 4 can identify a position of the nut 51*b* on the ball screw shaft 51*a* based on the rotation angle data. The processor 41 can identify a worn part based on a detection result related to the wear of the ball screw shaft 51*a* and the position of the nut 51*b*. The processor 41 may store acceleration data detected at each part of the ball screw shaft 51*a* or a degree of wear based on the acceleration data in the storage unit 42 in association with each other.

Furthermore, the control device 4 includes a display unit 40. The display unit 40 is a liquid crystal panel, an organic EL display, electronic paper, a plasma display, etc. The display unit 40 displays various information according to image data given from the processor 41.

Figure 8:
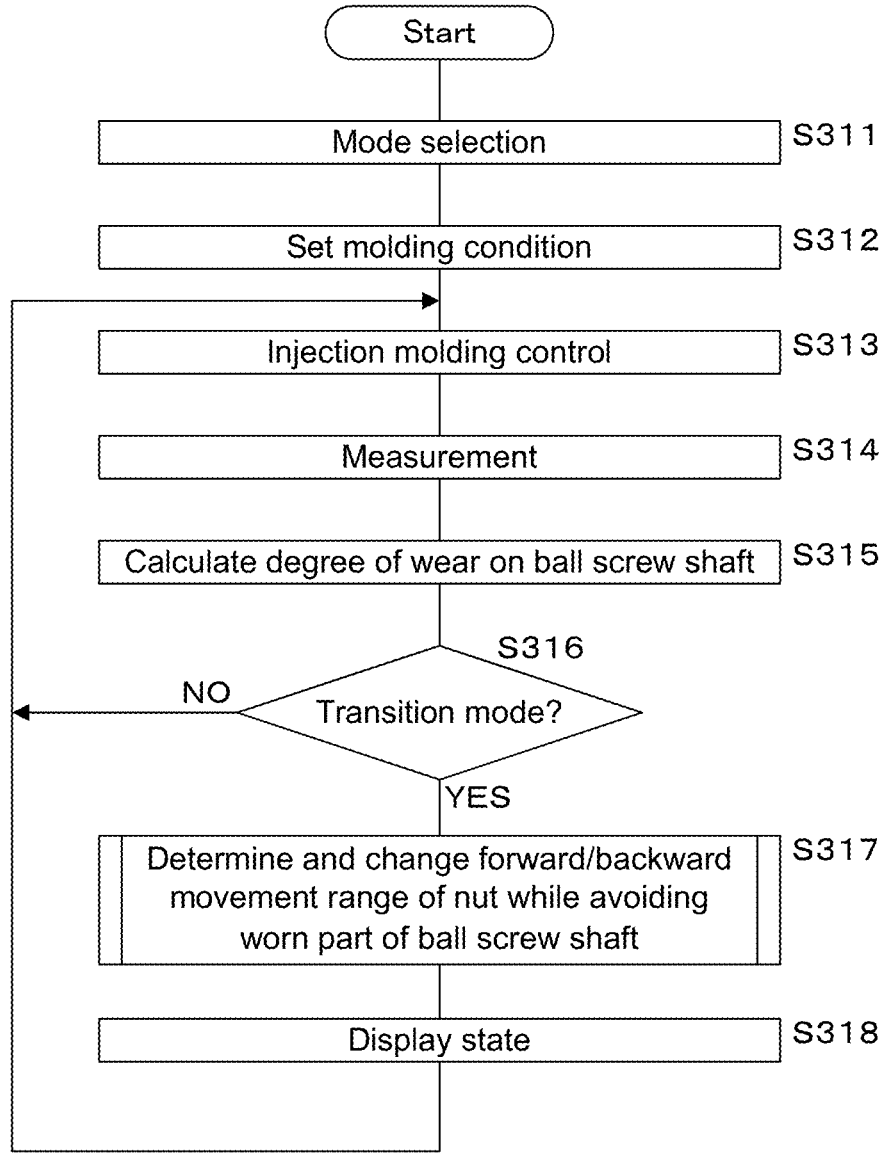
FIG. 8 is a flowchart illustrating a processing procedure of a processor according to a third embodiment.

FIG. 8 is a flowchart illustrating a processing procedure of the processor 41 according to the third embodiment. As in the first embodiment, the processor 41 receives mode selection (step S311), sets a molding condition (step S312), and executes processing related to injection molding control (step S313). Then, the processor 41 measures vibration of the nut 51*b* and the position of the nut 51*b* (step S314). Next, the processor 41 calculates the degree of wear and the position of the nut 51*b* on the ball screw shaft 51*a* (step S315).

Next, the processor 41 determines whether or not the transition mode is selected (step S316). When it is determined that the transition mode is not selected (step S316: NO), the processor 41 returns the process to step S313. When it is determined that the transition mode is selected (step S316: YES), the processor 41 determines and changes the forward/backward movement range while avoiding the worn part of the ball screw shaft 51*a* (step S317). The processor 41 may avoid the worn part of the ball screw shaft 51*a* and move the forward/backward movement range of the nut 51*b* by a predetermined amount as in the first embodiment, or may randomly change the forward/backward movement range of the nut 51*b* as in the second embodiment.

Figure 9:
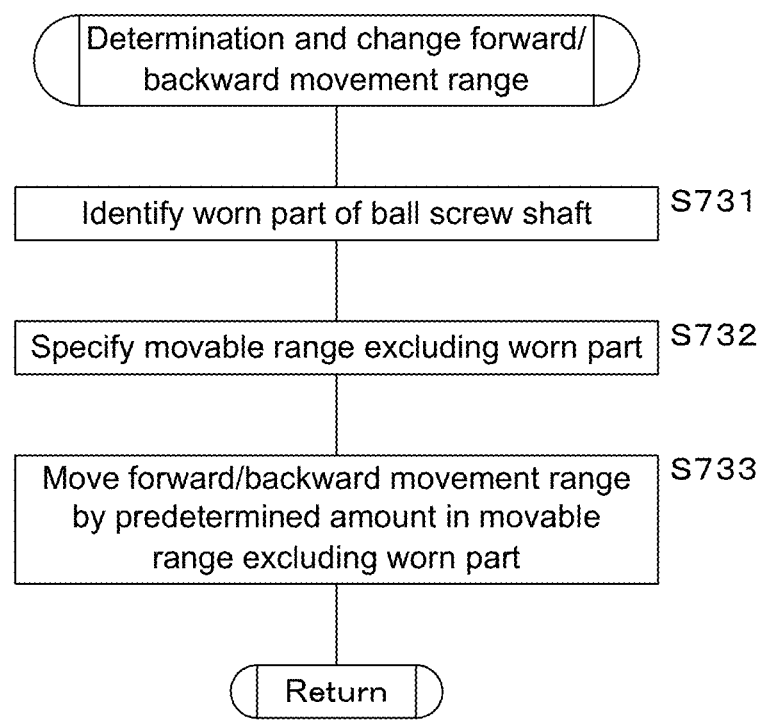
FIG. 9 is a flowchart illustrating details of a process of changing a forward/backward movement range.

FIG. 9 is a flowchart illustrating a first example of a process of changing the forward/backward movement range. The processor 41 identifies a worn part of the ball screw shaft based on a result of calculating the degree of wear and the position of the nut 51*b* on the ball screw shaft 51*a* calculated in step S315 (step S731). Next, the processor 41 specifies the movable range of the nut 51*b* excluding the worn part based on information indicating the movable range of the nut 51*b* stored in the storage unit 42 and information indicating the identified worn part (step S732). Then, the processor 41 moves the forward/backward movement range by a predetermined amount in the movable range specified in step S732 (step S733). In other words, the processor 41 moves the screw position before injection and the screw position after injection while maintaining a relative distance between the screw position before injection and the screw position after injection within the movable range. In addition, it can be considered that the processor 41 increases or decreases the weighing completion position and the pressure holding switching position by a predetermined amount within the movable range.

Figure 10:
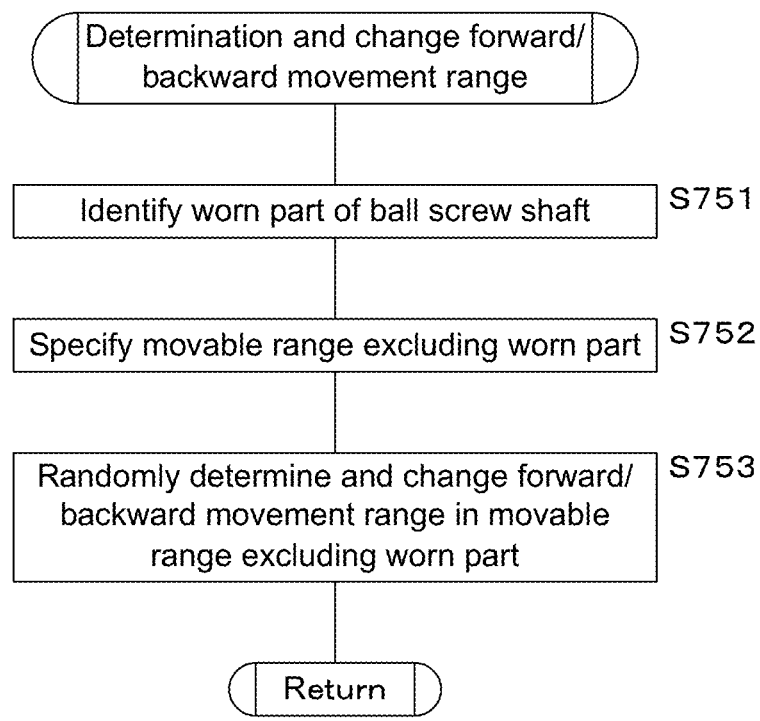
FIG. 10 is a flowchart illustrating details of a process of changing the forward/backward movement range.

FIG. 10 is a flowchart illustrating a second example of the process of changing the forward/backward movement range. The processor 41 identifies the worn part of the ball screw shaft based on a result of calculating the degree of wear and the position of the nut 51*b* on the ball screw shaft 51*a* calculated in step S315 (step S751). Next, the processor 41 specifies the movable range of the nut 51*b* excluding the worn part based on information indicating the movable range of the nut 51*b* stored in the storage unit 42 and information indicating the identified worn part (step S752). Then, the processor 41 randomly determines and changes the forward/backward movement range of the nut 51*b* in the movable range specified in step S752 (step S753). In other words, the processor 41 randomly changes the screw position before injection and the screw position after injection within the movable range of the nut 51*b* excluding the worn part while maintaining a relative distance between the screw position before injection and the screw position after injection. In addition, it can be considered that the processor 41 randomly changes the weighing completion position and the pressure holding switching position within the movable range of the nut 51*b* excluding the worn part while maintaining a relative distance between the weighing completion position and the pressure holding switching position.

Then, the processor 41 displays the worn part of the ball screw shaft 51*a* and a state of forward/backward movement of the nut 51*b* on the display unit 40 (step S318), and returns the process to step S313.

Figure 11:
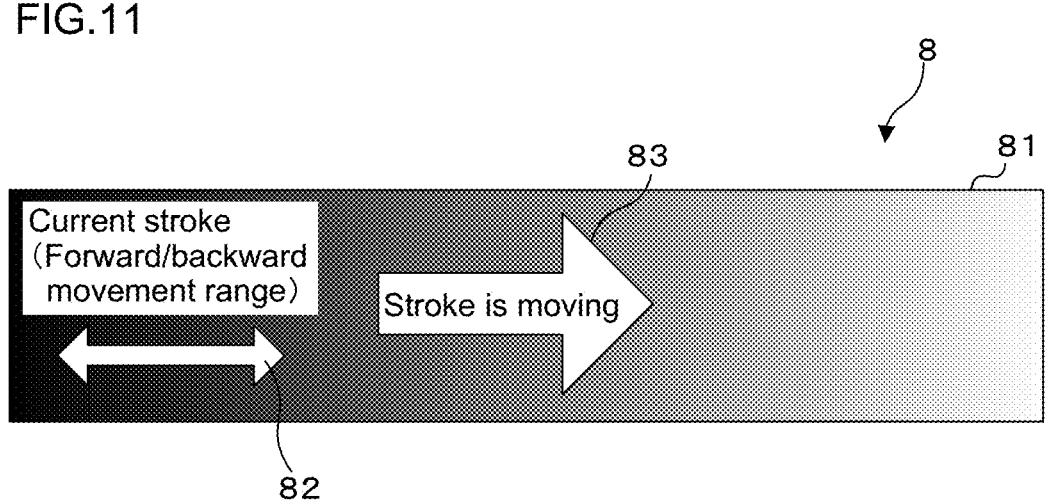
FIG. 11 is a schematic diagram illustrating an example of a state display screen according to the third embodiment.

FIG. 11 is a schematic diagram illustrating an example of a state display screen according to the third embodiment. The processor 41 displays the state display image 8 on the display unit 40 in step S318. The state display image 8 includes a movable range image 81 indicating the movable range of the nut 51*b*. The movable range image 81 is, for example, a horizontally long rectangular image. The movable range image 81 may be configured to display a wear state of the ball screw shaft 51*a*. For example, the movable range image 81 displays a portion of the ball screw shaft 51*a* where the wear is progressing in red, and a portion where the ball screw shaft 51*a* is not worn out in green. The color coding is an example, and the worn part may be displayed depending on the brightness of the image and the type of pattern image. A degree of progress of wear may be detected by the magnitude of vibration acceleration, or may be determined by the cumulative usage amount of movement of the nut 51*b*. The processor 41 displays an image indicating the current forward/backward movement range (stroke) of the nut 51*b*, for example, an arrow image 82, superimposed on the movable range image 81. The arrow image 82 is displayed in a superimposed manner at a position where a range of forward and backward movement of the nut 51*b* with respect to the ball screw shaft 51*a* corresponds to a range of the arrow image 82 with respect to the movable range image 81. Further, the processor 41 superimposes a transition direction image 83 indicating a direction in which the forward/backward movement range is being moved on the movable range image 81. The transition direction image 83 is, for example, an arrow-shaped image, and is displayed superimposed on the movable range image 81 so that a moving direction of the forward/backward movement range of the nut 51b coincides with a direction of the arrow.

According to the injection molding machine 1 according to the third embodiment, the forward/backward movement range of the nut 51b is sequentially moved while avoiding the worn part of the ball screw shaft 51a. Therefore, it is possible to more effectively prevent deterioration of lubricity and deviation of a heat generating part and extend the lifespan of the ball screw 51.

Further, the state display image 8 allows a user to visually recognize a current state of the ball screw shaft 51a and current moving directions of the forward/backward movement range and the forward/backward movement range of the nut 51b.

Note that, even though an example in which the worn part of the ball screw shaft 51a is detected using the vibration sensor or the acceleration sensor has been described in the third embodiment, wear of the ball screw shaft 51a may be detected based on a current value or torque of the injection servo motor 50.

Further, the display technology of the movable range image 81 according to the third embodiment can be applied to other embodiments as well. In the case of a configuration in which a worn part is not detected, the movable range image 81 is configured not to display the wear state of the ball screw shaft 51a, and the arrow image 82 and the transition direction image 83 may be displayed in the same manner as described above.

Fourth Embodiment

An injection molding machine 1 according to a fourth embodiment is different from the first embodiment in that the molding condition is corrected according to a degree of defectiveness of a molded product when the forward/backward movement range of the nut 51b is moved. The other configurations of the injection molding machine 1 are the same as those of the injection molding machine 1 according to the first embodiment, and thus the same reference numerals are attached to similar parts and detailed descriptions are omitted.

Figure 12:
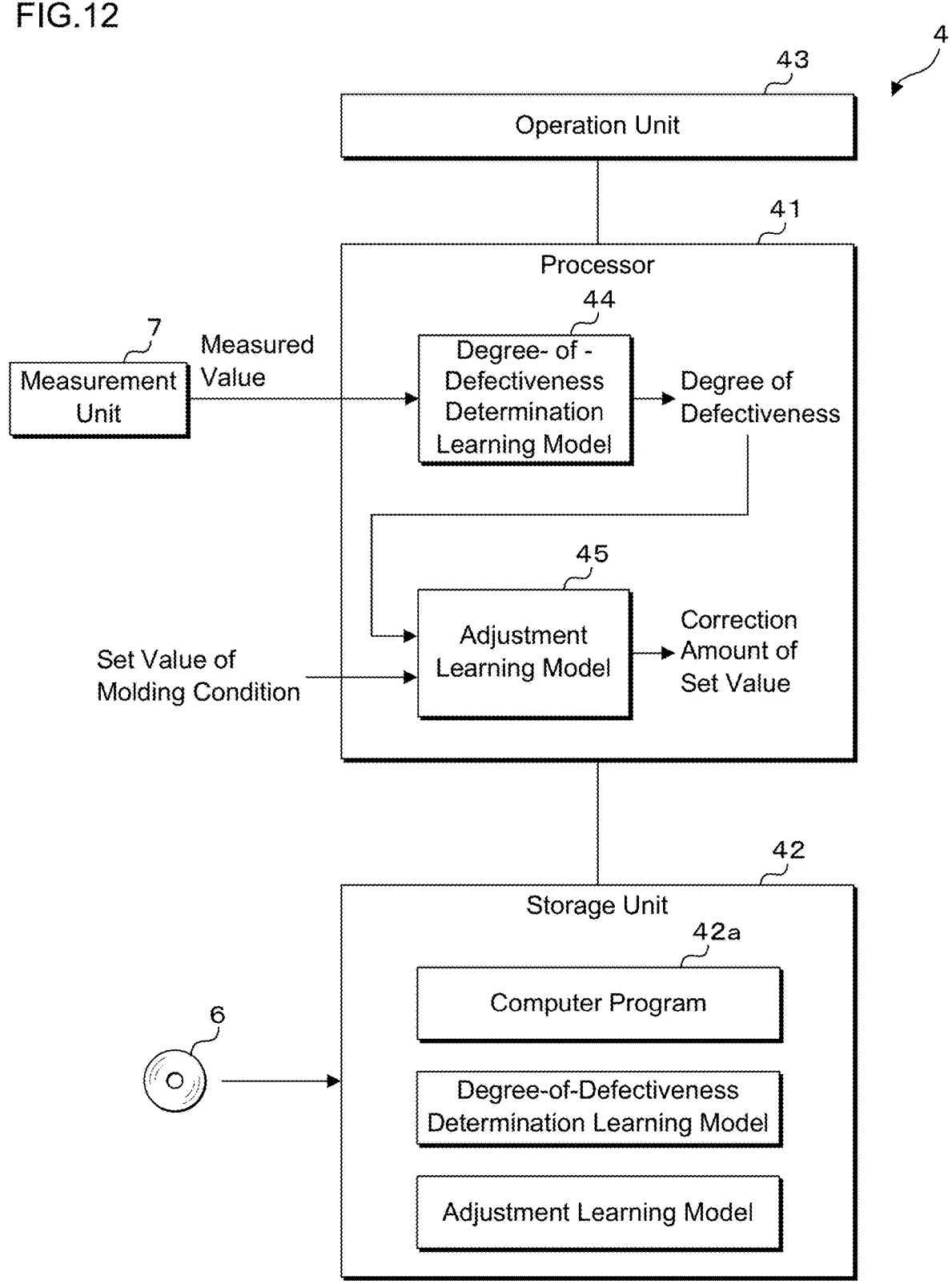
FIG. 12 is a block diagram illustrating a configuration example of a control device according to a fourth embodiment.

FIG. 12 is a block diagram illustrating a configuration example of a control device 4 according to the fourth embodiment. The injection molding machine 1 according to the fourth embodiment includes the measurement unit 7. The measurement unit 7 includes a thermometer, a pressure gauge, a speed measuring device, an acceleration measuring device, a position sensor, a timer, a weighing scale, etc. Information measured by the measurement unit 7 includes, for example, molded product information obtained from the molded product. For example, the molded product information includes information such as a camera image obtained by imaging the molded product, the amount of deformation of the molded product obtained using a laser displacement sensor, optical measurement values such as chromaticity and luminance of the molded product obtained using an optical measuring device, weight of the molded product measured using the weighing scale, and strength of the molded product measured using a strength measuring device. The measurement unit 7 may acquire information such as the temperature, vibration, and pressure of each part from the injection device 3, the drive device 5, and other peripheral devices.

The storage unit 42 according to the fourth embodiment stores a degree-of-defectiveness determination learning model 44 and an adjustment learning model 45. The processor 41 reads, from the storage unit 42, and executes the degree-of-defectiveness determination learning model 44, the adjustment learning model 45, and the computer program 42a.

For example, the degree-of-defectiveness determination learning model 44 is a neural network that outputs the degree of defectiveness of the molded product when physical quantity data, which is a measured value, is input. The degree-of-defectiveness determination learning model 44 includes an input layer, a hidden layer, and an output layer. The input layer has a plurality of nodes to which physical quantity data is input. The hidden layer includes a plurality of intermediate layers each having a plurality of nodes, and nodes of the intermediate layer on the input side are combined with the nodes of the input layer. The output layer has a node that outputs the degree of defectiveness of the molded product. Each node of the output layer is combined with a node of the intermediate layer on the output side.

For example, the degree-of-defectiveness determination learning model 44 can be generated by machine learning using training data including physical quantity data measured by the measurement unit 7 during injection molding and the degree of defectiveness of the molded product obtained at this time. For example, the processor 41 causes the degree-of-defectiveness determination learning model 44 to perform machine learning by optimizing weighting coefficients of the degree-of-defectiveness determination learning model 44 by using the error backpropagation method, the error gradient descent method, etc. using training data.

For example, the adjustment learning model 45 is a neural network that outputs a correction amount for a set value of the molding condition when the set value and the degree of defectiveness of the molded product are input. The adjustment learning model 45 includes an input layer, a hidden layer, and an output layer. The input layer has a plurality of nodes to which set values and degrees of defectiveness are input. The hidden layer includes a plurality of intermediate layers each having a plurality of nodes, and nodes of the intermediate layer on the input side are combined with nodes of the input layer. The output layer has a node that outputs the correction amount of the set value. Each node of the output layer is combined with a node of the intermediate layer on the output side. Set values to be corrected include, for example, a VP switching position, a weighing completion position, an injection speed, a pressure holding time, a holding pressure, a pressure holding speed, a pressure holding switching position, etc.

For example, the adjustment learning model 45 can be generated by machine learning using training data including a set value of a molding condition and a degree of defectiveness of the molded product obtained at this time. For example, the processor 41 causes the adjustment learning model 45 to perform machine learning by optimizing weighting coefficients of the adjustment learning model 45 by using the error backpropagation method, the error gradient descent method, etc. using training data.

Figure 13:
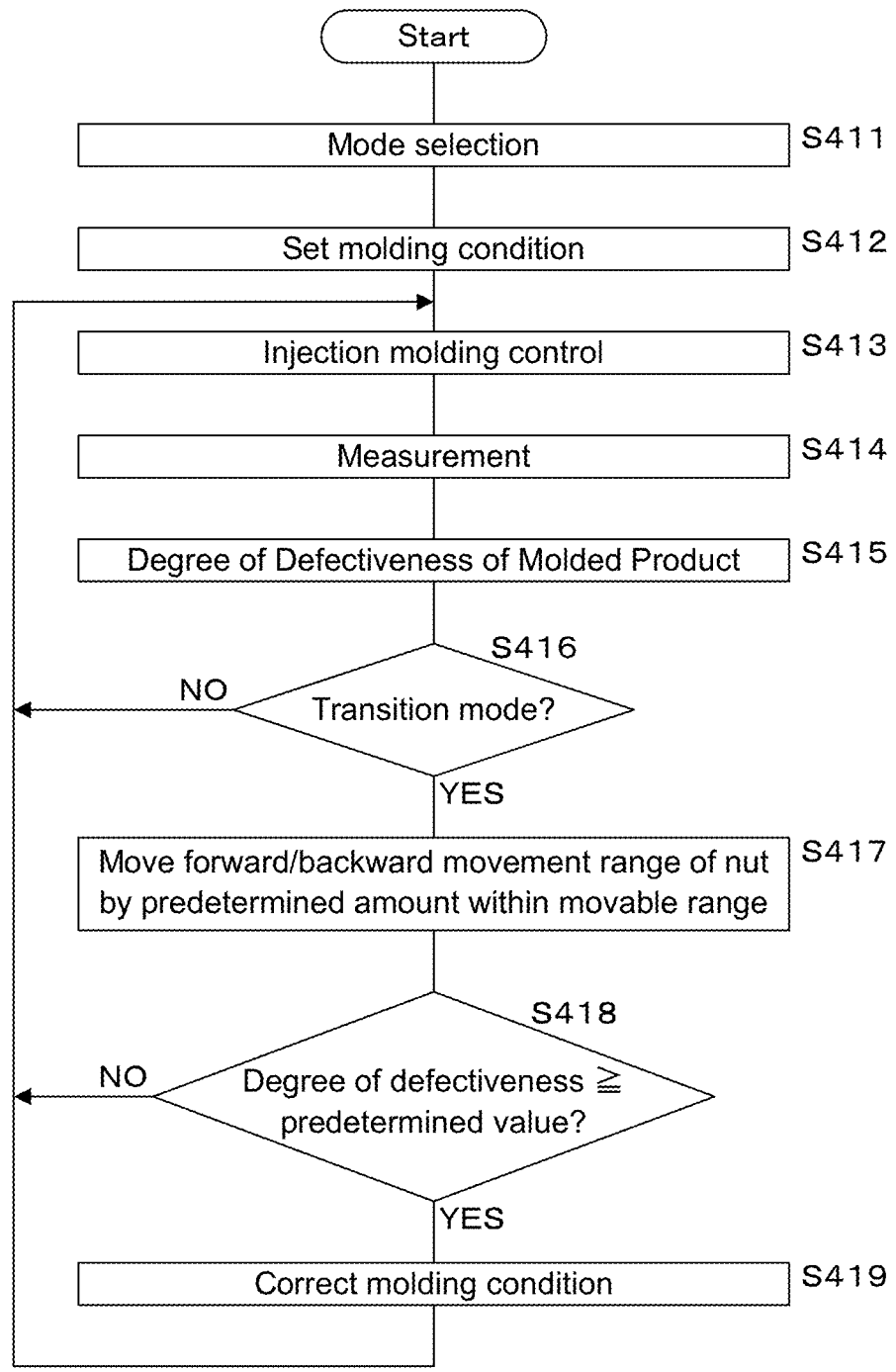
FIG. 13 is a flowchart illustrating a processing procedure of a processor according to a fourth embodiment.

FIG. 13 is a flowchart illustrating a processing procedure of the processor 41 according to the fourth embodiment. As in the first embodiment, the processor 41 receives mode selection (step S411), sets a molding condition (step S412), and executes processing related to injection molding control (step S413). Then, the processor 41 measures the physical quantities of the molded product using the measurement unit 7, and acquires physical quantity data indicating the state of the molded product (step S414). The processor 41 calculates the degree of defectiveness of the molded product by inputting the acquired physical quantity data to the degree-of-defectiveness determination learning model 44 (step S415).

Next, the processor 41 determines whether or not the transition mode is selected (step S416). When it is determined that the transition mode is not selected (step S416: NO), the processor 41 returns the process to step S413. When it is determined that the transition mode is selected (step S416: YES), the processor 41 moves the forward/backward movement range of the nut 51*b* by a predetermined amount within the movable range (step S417).

Next, the processor 41 determines whether or not the degree of defectiveness is greater than or equal to a predetermined value (step S418). When it is determined that the degree of defectiveness is less than the predetermined value (step S418: NO), the processor 41 returns the process to step S413. When it is determined that the degree of defectiveness is greater than or equal to the predetermined value (step S418: YES), the processor 41 corrects the set value of the molding condition (step S419), and returns the process to step S413. Specifically, the processor 41 calculates the correction amount of the set value by inputting the set value and the degree of defectiveness to the adjustment learning model 45, and corrects the set value of the molding condition using the calculated correction amount. The set value to be corrected is, for example, the VP switching position, the weighing completion position, the injection speed, the pressure holding time, the holding pressure, the pressure holding speed, the pressure holding switching position, etc.

According to the injection molding machine 1 according to the fourth embodiment, by moving the forward/backward movement ranges of the nut 51*b* and the screw 32, the molding condition can be corrected so that quality of the molded product does not deteriorate. Therefore, it is possible to prevent deterioration of lubricity and deviation of a heat generating part and extend the lifespan of the ball screw 51 even under short injection stroke molding conditions without adversely affecting the quality of the molded product.

Note that, even though an example of calculating the degree of defectiveness of the molded product and the correction amount of the set value using a neural network learning model has been described in the fourth embodiment, the degree of defectiveness of the molded product and the correction amount of the set value may be calculated using other known machine learning models such as SVM (Support Vector Machine) and Bayesian network. Alternatively, on a rule basis, the degree of defectiveness of the molded product may be calculated and the molding condition may be corrected. For example, the degree of defectiveness of the molded product may be calculated by pattern matching processing on an image obtained by imaging the molded product, processing of calculating a difference between the weight of the molded product and the weight of a normal product, etc. Further, when the degree of defectiveness of the molded product increases, movement of the weighing completion position and the pressure holding switching position may be stopped, or the weighing completion position and the pressure holding switching position may be returned to previous states.

Further, even though a description has been given of an example in which the molding condition is corrected by supervised learning, the molding condition may be corrected by reinforcement learning.

Further, even though a description has been given of an example in which the nut 51*b* is moved by a predetermined amount in this embodiment, a predetermined amount of movement may be increased or decreased depending on the degree of defectiveness of the molded product. For example, a control operation may be performed so that the predetermined amount decreases as the degree of defectiveness increases.

Furthermore, the fourth embodiment is applicable to the second and third embodiments.

Fifth Embodiment

An injection molding machine 1 according to a fifth embodiment is different from the first embodiment in that the molding condition is corrected according to movement of the forward/backward movement range of the nut 51*b*. The other configurations of the injection molding machine 1 are the same as those of the injection molding machine 1 according to the first embodiment, and thus the same reference numerals are attached to similar parts and detailed descriptions are omitted.

A storage unit 42 according to the fifth embodiment stores an adjustment learning model 545. The processor 41 reads, from the storage unit 42, and executes the adjustment learning model 545 and the computer program 42*a*.

Figure 14:
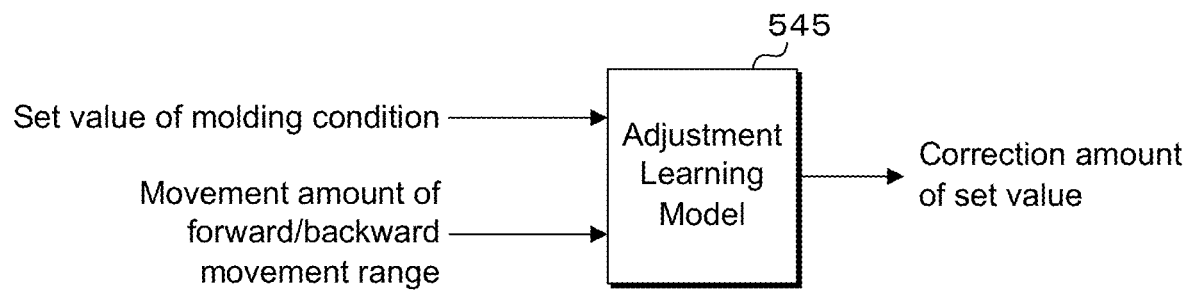
FIG. 14 is a block diagram illustrating an adjustment learning model according to a fifth embodiment.

FIG. 14 is a block diagram illustrating the adjustment learning model 545 according to the fifth embodiment. The adjustment learning model 545 is, for example, a neural network that outputs a correction amount for a set value of a molding condition when the set value and the movement amount of the forward/backward movement range are input. The adjustment learning model 545 includes an input layer, a hidden layer, and an output layer. The input layer has a plurality of nodes to which the set value and the forward/backward movement range movement amount are input. The hidden layer includes a plurality of intermediate layers each having a plurality of nodes, and nodes of the intermediate layer on the input side are combined with the nodes of the input layer. The output layer has a node that outputs the correction amount of the set value. Each node of the output layer is combined with a node of the intermediate layer on the output side.

For example, the adjustment learning model 545 can be generated by machine learning using training data including the set value of the molding condition, the amount of movement of the forward/backward movement range of the nut 51*b*, and the correction amount of the set value suitable for changing the forward/backward movement range. For example, the processor 41 causes the adjustment learning model 545 to perform machine learning by optimizing weighting coefficients of the adjustment learning model 545 by using the error backpropagation method, the error gradient descent method, etc. using training data.

Figure 15:
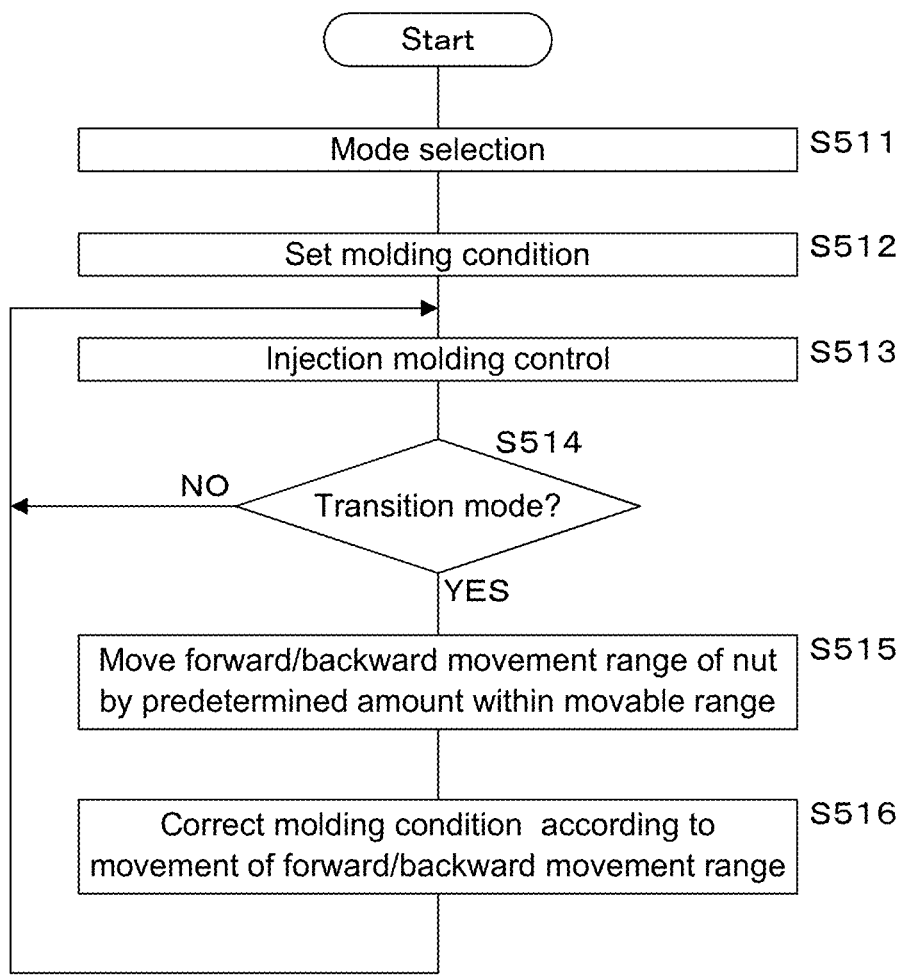
FIG. 15 is a flowchart illustrating a processing procedure of a processor according to the fifth embodiment.

FIG. 15 is a flowchart illustrating a processing procedure of the processor 41 according to the fifth embodiment. As in the first embodiment, the processor 41 receives mode selection (step S511), sets a molding condition (step S512), and executes processing related to injection molding control (step S513). When it is determined that the transition mode is not selected (step S514: NO), the processor 41 returns the process to step S513. When the transition mode is selected (step S514: YES), the processor 41 moves the forward/ backward movement range of the nut 51b by a predetermined amount within the movable range (step S515). Then, the processor 41 calculates the correction amount of the molding condition according to movement of the forward/backward movement range, corrects the molding condition (step S516), and returns the process to step S513. Specifically, the processor 41 calculates the correction amount of the set value of the molding condition by inputting the set value of the molding condition and the movement amount of the forward/backward movement range to the adjustment learning model 545. Then, the set value of the molding condition is corrected using the calculated correction amount. Note that the set value to be corrected includes the weighing completion position and the pressure holding switching position of the screw 32.

According to the injection molding machine 1 according to the fifth embodiment, by moving the forward/backward movement ranges of the nut 51b and the screw 32, the molding condition can be corrected so that quality of the molded product does not deteriorate. Therefore, it is possible to prevent deterioration of lubricity and deviation of a heat generating part and extend the lifespan of the ball screw 51 even under short injection stroke molding conditions without adversely affecting the quality of the molded product.

Sixth Embodiment

An injection molding machine 1 according to a sixth embodiment is different from the first embodiment in that the forward/backward movement range of the nut 51b is moved depending on the molding difficulty level. The other configurations of the injection molding machine 1 are the same as those of the injection molding machine 1 according to the first embodiment, and thus the same reference numerals are attached to similar parts and detailed descriptions are omitted.

Figure 16:
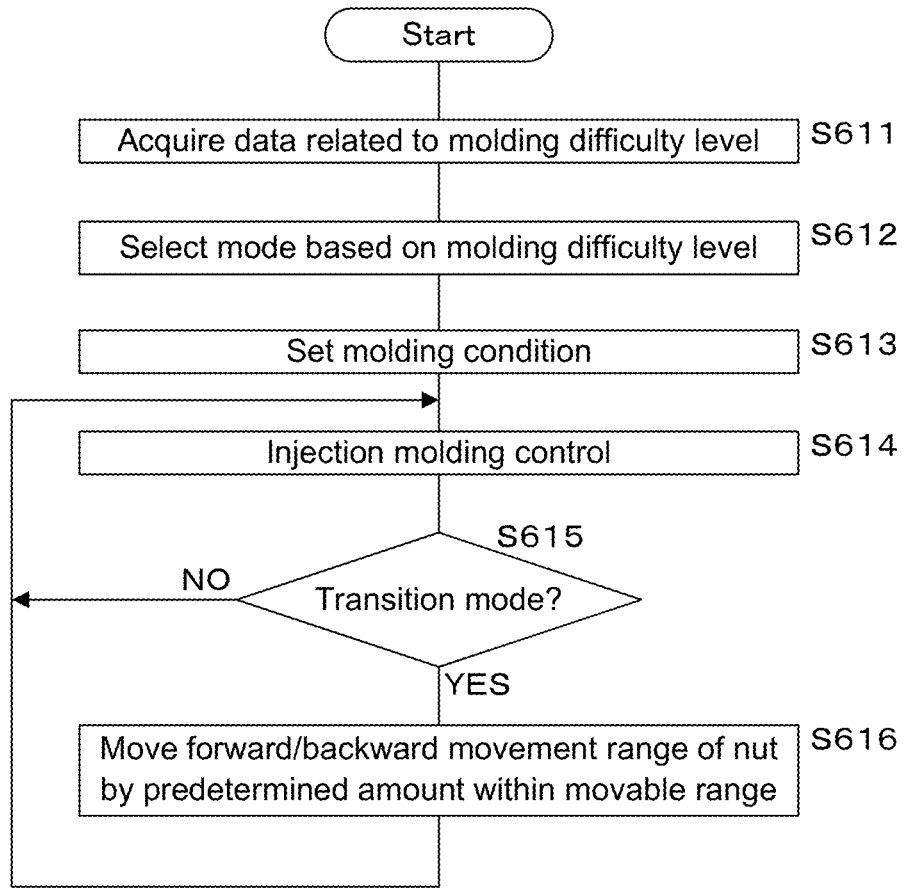
FIG. 16 is a flowchart illustrating a processing procedure of a processor according to a sixth embodiment.

FIG. 16 is a flowchart illustrating a processing procedure of the processor 41 according to the sixth embodiment. The processor 41 according to the sixth embodiment acquires data related to the molding difficulty level (step S611). The data related to the molding difficulty level is stored in the storage unit 42 in association with, for example, a molding condition. Further, the processor 41 may obtain data related to the molding difficulty level via the operation unit 43. Furthermore, the processor 41 may be configured to calculate the data related to the molding difficulty level based on the molding condition. The processor 41 selects a mode based on the acquired data related to the molding difficulty level (step S612). For example, the processor 41 selects the normal mode when the molding difficulty level is greater than or equal to a threshold, and selects the transition mode when the molding difficulty level is less than the threshold. Thereafter, the same processes as those of steps S112 to S115 of the first embodiment are executed (steps S613 to S616).

According to the injection molding machine 1 according to the sixth embodiment, the forward/backward movement ranges of the nut 51b and the screw 32 are moved when there is a low possibility that quality of the molded product will deteriorate in consideration of the molding difficulty level, and it is possible to prevent deterioration of lubricity and deviation of a heat generating part and extend the lifespan of the ball screw 51 even under short injection stroke molding conditions without adversely affecting the quality of the molded product.

It is to be noted that, as used herein and in the appended claims, the singular forms "a" "an", and "the" include plural referents unless the context clearly dictates otherwise. It is to be further noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. An injection molding machine, comprising:
a screw provided in a cylinder having a nozzle at a tip so that the screw is allowed to be driven in a rotational direction and an axial direction;
a drive device configured to drive the screw; and
a control device configured to control an operation of the drive device, wherein:
the drive device has a ball screw including a rotatably provided ball screw shaft and a nut screwed onto the ball screw shaft, the nut moving forward and backward in response to rotation of the ball screw shaft, and driving the screw in the axial direction by forward and backward movement of the nut, and
the control device sequentially moves a screw position before injection and a screw position after injection in a molding process cycle so that a forward/backward movement range of the nut in the molding process cycle is dispersed.

2. The injection molding machine according to claim 1, wherein the control device reciprocates the forward/backward movement range within a movable range of the nut by moving the screw position before injection and the screw position after injection by a predetermined amount.

3. The injection molding machine according to claim 1, wherein the control device monitors a worn part of the ball screw shaft and determines the screw position before injection and the screw position after injection so that the forward/backward movement range of the nut does not overlap with the worn part.

4. The injection molding machine according to claim 1, wherein the control device randomly determines the screw position before injection and the screw position after injection.

5. The injection molding machine according to claim 1, wherein:
data related to a molding difficulty level is acquired, and
when the molding difficulty level is less than a predetermined value, the control device controls to move the screw position before injection and the screw position after injection.

6. The injection molding machine according to claim 1, wherein:
physical quantity data indicating a state of a molded product is acquired,
a degree of defectiveness of the molded product is calculated based on the acquired physical quantity data, and
when the degree of defectiveness of the molded product is greater than or equal to a threshold, a molding condition set in the molding machine is changed.

7. A control method of controlling an operation of a drive device including a rotatably provided ball screw shaft and a nut screwed onto the ball screw shaft and moved forward and backward in response to rotation of the ball screw shaft, and driving a screw of an injection molding machine by forward and backward movement of the nut, the control method comprising:

sequentially moving a screw position before injection and a screw position after injection in a molding process cycle so that a forward/backward movement range of the nut in the molding process cycle is dispersed.

8. A non-transitory computer readable recording medium storing a computer program for causing a computer to control an operation of a drive device including a rotatably provided ball screw shaft and a nut screwed onto the ball screw shaft and moved forward and backward in response to rotation of the ball screw shaft, and driving a screw of an injection molding machine by forward and backward movement of the nut, the computer program causing the computer to execute a process of sequentially moving a screw position before injection and a screw position after injection in a molding process cycle so that a forward/backward movement range of the nut in the molding process cycle is dispersed.

\* \* \* \* \*